(12) United States Patent
Bieber et al.

(10) Patent No.: US 6,799,774 B2
(45) Date of Patent: Oct. 5, 2004

(54) AIRBAG MODULE

(75) Inventors: Udo Bieber, Niedernberg (DE); Matthias Helmstetter, Aschaffenburg (DE); Ralph Neupert, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 94 days.

(21) Appl. No.: 10/122,609

(22) Filed: Apr. 12, 2002

(65) Prior Publication Data

US 2002/0153711 A1 Oct. 24, 2002

(30) Foreign Application Priority Data

Apr. 18, 2001 (DE) ................................ 201 06 695 U

(51) Int. Cl.$^7$ .............................................. B60R 21/16
(52) U.S. Cl. .................................. 280/728.2; 280/731
(58) Field of Search .......................... 280/728.2, 731, 280/732, 743.1, 728.3

(56) References Cited

U.S. PATENT DOCUMENTS

| | | | | |
|---|---|---|---|---|
| 5,356,174 A | * | 10/1994 | Rhein et al. | ............. 280/728.2 |
| 5,520,409 A | * | 5/1996 | Saderholm | ............... 280/728.2 |
| 5,709,401 A | * | 1/1998 | Schenck | .................. 280/728.2 |
| 5,829,777 A | | 11/1998 | Sakurai et al. | |
| 6,010,146 A | * | 1/2000 | Otsuka et al. | ........... 280/728.2 |
| 6,092,834 A | | 7/2000 | Staub et al. | |
| 6,173,987 B1 | | 1/2001 | Terasawa et al. | |
| 6,199,899 B1 | * | 3/2001 | Krebs et al. | ................. 280/731 |
| 6,273,455 B1 | * | 8/2001 | Bohn | ....................... 280/728.2 |
| 6,283,497 B1 | * | 9/2001 | Zimmerbeutel et al. | . 280/728.2 |
| 6,371,508 B1 | * | 4/2002 | Baur et al. | ............... 280/728.2 |

FOREIGN PATENT DOCUMENTS

| | | |
|---|---|---|
| DE | 19804579 | 8/1999 |
| DE | 19837899 | 2/2000 |
| EP | 0999100 A2 | 5/2000 |
| GB | 2323572 A | 9/1998 |

* cited by examiner

Primary Examiner—David R. Dunn
(74) Attorney, Agent, or Firm—Tarolli, Sundheim, Covell & Tummino L.L.P.

(57) ABSTRACT

An airbag module for occupant restraint systems in vehicles has a pot-like housing part (10) made of sheet metal to the base (14) of which a gas generator is attached and to the circumferential wall (16) of which, extending upwards from the base (14), an airbag (26) and a covering cap (12) made of plastic are attached. The covering cap (12) has a supporting wall (17) that is in contact with the outside of the circumferential wall (16) of the housing part (10). The supporting wall (17) is provided with cutouts (20). On the free edge of the circumferential wall (16) of the housing part (10) facing away from the base (14), there are arranged hook-shaped metal tabs (18) which pass through the cutouts (20) of the supporting wall (17) of the covering cap (12) and which are bent on their outside in the direction toward the base (14) of the housing part (10). The free edge of the supporting wall (17) of the covering cap (12) facing the base (14) of the housing part (10) is held in contact with the circumferential wall (16) of the housing part (10) by means of bending tabs (22) that have been punched out of the housing part (10) and bent against the outside of the supporting wall (17).

7 Claims, 3 Drawing Sheets

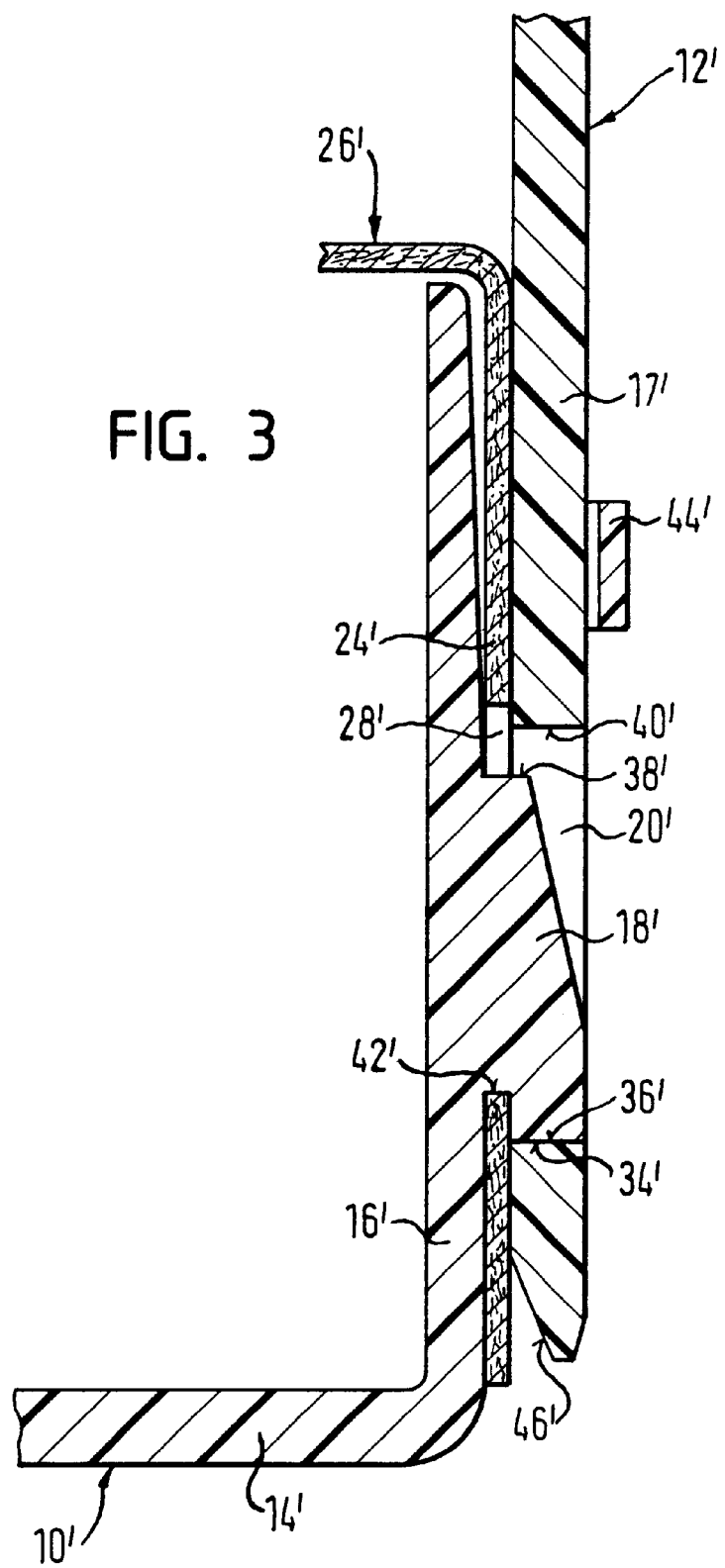

AIRBAG MODULE

The present invention relates to an airbag module for occupant restraint systems in vehicles.

BACKGROUND OF THE INVENTION

The attachment of a covering cap on the housing part of an airbag module must meet the requirement that the covering cap, in spite of the simplest possible assembly, must remain attached to the housing part when it is exposed to the extreme forces that occur when the airbag is activated. In the conventional airbag modules, therefore, the attachment is largely effectuated by means of screwing or riveting.

SUMMARY OF THE INVENTION

The invention provides an airbag module for occupant restraint systems in vehicles the covering cap of which can be mounted in a simple manner and with which an unintentional detachment of the covering cap from the housing part is ruled out.

Specifically, according to a first embodiment of the invention, the airbag module for an occupant restraint system in a vehicle, comprises a housing made of sheet metal and having a bottom wall and a peripheral wall extending from the bottom wall, a gas generator attached to the bottom wall, an airbag attached to the peripheral wall and a cover cap also attached to the peripheral wall. The cover cap has a connection wall fitted over the peripheral wall of the housing. The connection wall has a plurality of cutouts spaced from each other in a peripheral direction. The peripheral wall of the housing has an edge remote from the bottom wall with hook-shaped tabs formed thereon corresponding in number and position to the cutouts in the connection wall of the cover cap. Each of the hook-shaped tabs passes radially outwardly through a respective one of the cutouts and has a free end bent in a direction toward the bottom wall along part of an outer surface of the connection wall. The housing in an area of the peripheral wall adjoining the bottom wall has a plurality of punched-out tabs bent outwardly and pressed against an outer surface of the connection wall close to the bottom wall.

According to a second embodiment of the invention, an airbag module for an occupant restraint system in a vehicle is provided that comprises a housing molded of plastics and having a bottom wall and a peripheral wall extending from the bottom wall, a gas generator attached to the bottom wall, an airbag attached to the peripheral wall and a cover cap also attached to the peripheral wall. The airbag has an attachment collar with peripherally spaced attachment openings therein. The peripheral wall has an outer surface with integrally molded latching noses thereon that pass through respective ones of the attachment openings. The cover cap has a connection wall fitted over the attachment collar of the airbag and over the peripheral wall of the housing. The connection wall has peripherally spaced cutouts corresponding in number and shape to the latching noses which engage into the cutouts.

BRIEF DESCRIPTION OF THE DRAWINGS

The invention is shown below with reference to two embodiments that are depicted in the accompanying drawings. The drawings show the following:

FIG. 3—a section of an airbag module according to the second inventive idea in a side view.

DESCRIPTION OF THE PREFERRED EMBODIMENTS

Figure 1:
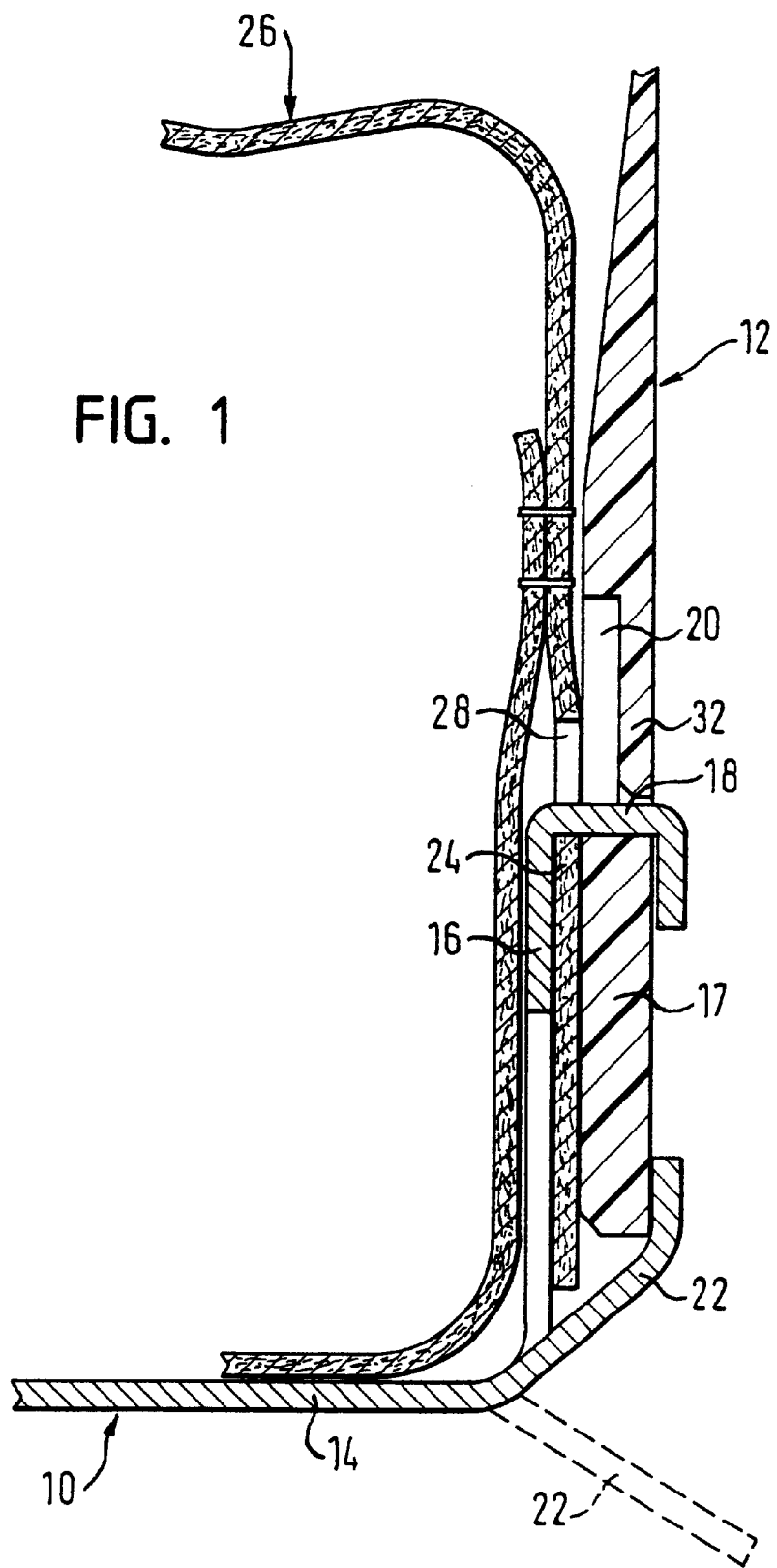
FIG. 1—a section of an airbag module according to the first inventive idea in a side view.
Figure 2:
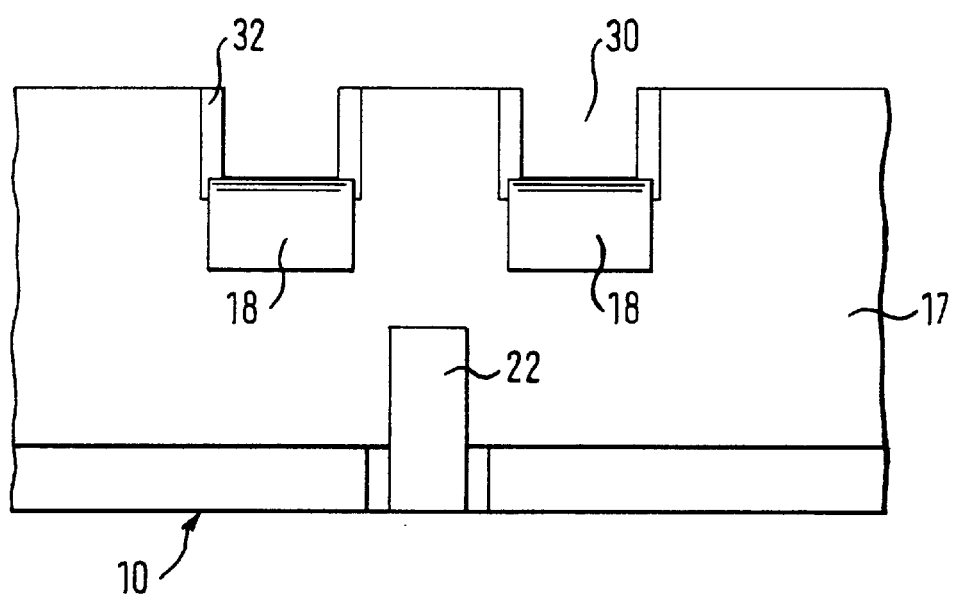
FIG. 2—a section of the covering cap and of the housing part of the airbag module of FIG. 1 in a schematic front view.

The airbag module, a section of which is shown in FIG. 1, has a pot-like housing part 10 made of sheet metal and a covering cap 12 made of plastic. The pot-like housing part 10 consists of a base 14 onto which a gas generator can be attached, and of a circumferential wall 16 that extends upwards from the base, a supporting wall 17 of the covering cap 12 lying on the outside of the circumferential wall 16. At intervals on the circumferential wall 16, at its upper end relative to FIG. 1, there are hook-shaped metal tabs 18 that each pass into a cutout 20 of the supporting wall 17 of the covering cap 12 and that are bent down on their outside in the direction of the base 14 of the pot-like housing part 10. At its lower end relative to FIG. 1, the covering cap 12 is held in contact with the circumferential wall 16 of the housing part by means of punched-out bending tabs 22 that have been bent against the outer wall of the supporting wall 17. An attachment collar 24 of an airbag 26 is clamped between the outer surface of the circumferential wall 16 of the housing part and the inner surface of the supporting wall 17 of the covering cap. The attachment collar 24 of the airbag 26 is turned over the circumferential wall 16 of the housing part 10 in such a way that the hook-shaped, bent metal tabs 18 project through suspension openings 28 on the attachment collar 24 of the airbag 26. In order to secure the covering cap 12 onto the hook-shaped metal tabs 18 that pass through the cutouts 20, there are several cutouts 20 of the supporting wall 17 (also see FIG. 2) which are each formed by a U-shaped, cutaway slit 30 that delimits a deflectable arresting tab 32.

In assembling an airbag module of FIG. 1 according to the invention, the covering cap 12 is pushed over the pot-like housing part 10 so that the hook-shaped metal tabs 18 latch in the cutouts 20. Subsequently, the punched-out metal tabs 22 are bent out of the position shown by a dotted line in FIG. 1 against the outside of the supporting wall 17, so that the supporting wall 17 is held in contact with the circumferential wall 16.

The airbag module, a section of which is shown in FIG. 3 has a pot-like housing part 10' made of plastic and a covering cap 12' with a supporting wall 17'. The pot-like housing part 10' likewise consists of a base 14' on which a gas generator can be attached, and a circumferential wall 16' extending upwards from the base. Latching noses 18' are shaped onto the outside of the circumferential wall 16', and the noses project through cutouts 20' of the supporting wall 17'. One latching nose 18' and one cutout 20' act together in such a way that a latching surface 34'—which faces upward relative to FIG. 3—of the covering cap 12', lies against a latching edge 36'—which faces downward relative to FIG. 3—of the latching noses 18'. This prevents a shifting of the covering cap with respect to the housing part downward relative to FIG. 3. In order to prevent unlatching due to a movement in the opposite direction, namely, upwards relative to FIG. 3, on each end of a latching nose 18' opposite from the latching edge 36', there is a stop surface 38' that can interact with an adjacent delimitation edge 40' of a cutout 20'. An attachment collar 24' of an airbag 26' is turned over the circumferential wall 16' and the collar is attached in suspension openings 28' on the latching noses 18' of the pot-like housing part 10'. For this purpose, in each latching edge 36' of a latching nose 18', a groove 42' has been left open, into which the edge of a suspension opening 28' of the airbag 26' passes. In this manner, the attachment collar 24' of the airbag 26' is clamped between the circumferential wall 16' and the supporting wall 17'. The circumferential wall 16' of the housing part 10' extends beyond the latching nose 18' in the direction facing the base 14', so that the interior of the airbag 26' is delimited by the circumferential wall 16' with respect to the cutout 20' and consequently, when the airbag is inflated and unfolded, blowing through the cutouts 20' is prevented. In order to hold the supporting wall 17' of the covering cap 12' in contact with the circumferential wall 16' of the housing part 10', the supporting wall is surrounded by a securing strap 44' above the latching nose 18' relative to FIG. 3. Furthermore, the supporting wall 17' has a ramp 46' on the inside of its lower end relative to FIG. 3. When the covering cap 12' is mounted onto the pot-like housing part 10', the ramp 46' makes it easier to slip the supporting wall 17' of the covering cap over the latching noses 18'.

During the assembly of an airbag module according to the invention of FIG. 3, the covering cap 12' is pushed over the pot-like housing part 10', so that the latching noses 18' latch in the cutouts 20'. Subsequently, the supporting wall 17' is surrounded with the securing strap 44', so that the supporting wall 17' is held in contact with the circumferential wall 16'.

What is claimed is:

1. An airbag module for an occupant restraint system in a vehicle, comprising a housing molded of plastics and having a bottom wall and a peripheral wall extending from the bottom wall, a gas generator attached to the bottom wall, an airbag attached to the peripheral wall and a cover cap also attached to the peripheral wall, wherein the airbag has an attachment collar with peripherally spaced attachment openings therein, the peripheral wall has an outer surface with integrally molded latching noses thereon that pass through respective ones of said attachment openings, the cover cap has a connection wall fitted over the attachment collar of the airbag and over the peripheral wall of the housing, and the connection wall has peripherally spaced cutouts corresponding in number and shape to said latching noses which engage into said cutouts, said connection wall having an outer surface, said latching noses when engaging into said cutouts being flush with said outer surface of said connection wall, said latching noses each have a stop surface interacting with an adjacent delimitation edge of one of said cutouts for preventing unlatching of said covering cap from said housing due to a movement in a first direction, and said latching noses each have a latching edge interacting with an adjacent latching surface of one of said cutouts for preventing unlatching of said covering cap from said housing due to a movement in a second direction opposite to said first direction.

2. The airbag module of claim 1, wherein the peripheral wall of the housing extends beyond said latching noses in a direction away from the bottom wall.

3. The airbag module of claim 1, wherein the connection wall of the cover cap is surrounded by a peripheral clamping strap.

4. The airbag module of claim 3, wherein the clamping strap is located on a side of the latching noses facing away from said bottom wall.

5. The airbag module of claim 1, wherein the connection wall of the cover cap has a free edge close to the bottom wall and provided with a bevel on its side facing the peripheral wall of the housing.

6. An airbag module for an occupant restraint system in a vehicle, comprising a housing molded of plastics and having a bottom wall and a peripheral wall extending from the bottom wall, a gas generator attached to the bottom wall, an airbag attached to the peripheral wall and a cover cap also attached to the peripheral wall, wherein the airbag has an attachment collar with peripherally spaced attachment openings therein, the peripheral wall has an outer surface with integrally molded latching noses thereon that pass through respective ones of said attachment openings, the cover cap has a connection wall fitted over the attachment collar of the airbag and over the peripheral wall of the housing, and the connection wall has peripherally spaced cutouts corresponding in number and shape to said latching noses which engage into said cutouts, wherein each latching nose has a latching face with a recessed groove and an edge portion of said airbag which defines a corresponding attachment opening is engaged in said groove.

7. An airbag module for an occupant restraint system in a vehicle, comprising a housing molded of plastics and having a bottom wall and a peripheral wall extending from the bottom wall, a gas generator attached to the bottom wall, an airbag attached to the peripheral wall and a cover cap also attached to the peripheral wall, wherein the airbag has an attachment collar with peripherally spaced attachment openings therein, the peripheral wall has an outer surface with integrally molded latching noses thereon that pass through respective ones of said attachment openings, the cover cap has a connection wall fitted over the attachment collar of the airbag and over the peripheral wall of the housing, and the connection wall has peripherally spaced cutouts corresponding in number and shape to said latching noses which engage into said cutouts, wherein each latching nose has a latching face extending normally with respect to the peripheral wall of the housing, an abutment face parallel to and spaced from said latching face, and a ramp face connecting said latching face with said abutment face.

* * * * *